(12) United States Patent
Dore (10) Patent No.: US 10,068,491 B2
(45) Date of Patent: *Sep. 4, 2018

(54) INTERACTIVE AND EDUCATIONAL TOOLS

(71) Applicant: Carol Bonner Design LLC, Seattle, WA (US)

(72) Inventor: Carol Dore, Seattle, WA (US)

(73) Assignee: Carol Bonner Design LLC, Seattle, WA (US)

( * ) Notice: Subject to any disclaimer, the term of this patent is extended or adjusted under 35 U.S.C. 154(b) by 68 days.

This patent is subject to a terminal disclaimer.

(21) Appl. No.: 14/755,281

(22) Filed: Jun. 30, 2015

(65) Prior Publication Data
US 2017/0076625 A1    Mar. 16, 2017

(51) Int. Cl.
| G09B 25/00 | (2006.01) |
| G09B 17/00 | (2006.01) |
| G09B 1/00 | (2006.01) |
| G09B 23/02 | (2006.01) |

(52) U.S. Cl.
CPC ............... *G09B 17/00* (2013.01); *G09B 1/00* (2013.01); *G09B 23/02* (2013.01)

(58) Field of Classification Search
CPC .......... G09B 17/00; G09B 19/02; G09B 1/00; G09B 1/22; G09B 23/02; A63F 2009/0815; A63F 9/0811; A63F 2003/00277

USPC .......... 434/98, 101, 102, 104, 172–174, 198, 434/199, 205, 402, 404, 405
See application file for complete search history.

(56) References Cited

U.S. PATENT DOCUMENTS

|  |  |  |  |  |
|---|---|---|---|---|
| 259,920 | A * | 6/1882 | Reiff ....................... | G09B 17/00 434/174 |
| 1,161,381 | A * | 11/1915 | Duffy ....................... | G06G 1/02 235/67 |
| 1,587,928 | A * | 6/1926 | Thompson .............. | G09B 19/02 434/198 |
| 4,389,193 | A * | 6/1983 | Phillips ................... | G09B 17/00 434/174 |

* cited by examiner

*Primary Examiner* — Jerry-Daryl Fletcher
(74) *Attorney, Agent, or Firm* — John W. Branch; Lowe Graham Jones PLLC (57) ABSTRACT

Educational tools including a cover, a shaft, and a rotating member. The cover includes an interactive section having a fixed set of indicia, a first lateral section pivotally coupled to the interactive section, and a second lateral section pivotally coupled to the interactive section opposite the first lateral section. The shaft is mounted to the interactive section and the rotating member is rotationally mounted to the shaft. The rotating member has a rotating set of indicia at a plurality of radial positions. The rotating member is configured to selectively rotate about the shaft to a plurality of aligned positions where the rotating set of indicia and the fixed set of indicia align. The rotating set of indicia and the fixed set of indicia are selected to have educational significance when aligned in selected combinations. In some examples, the educational tool includes a second rotating member.

15 Claims, 6 Drawing Sheets

INTERACTIVE AND EDUCATIONAL TOOLS

BACKGROUND

The present disclosure relates generally to educational tools. In particular, educational tools introducing children to core educational concepts in fun, interactive ways are described.

Education is a central concern to parents, society, and to national prosperity. Early education is recognized as a highly important concept to build a strong foundation for later educational initiatives in the classroom and other sources. Core educational concepts that are important for children to be introduced to at a young age include basic concepts in mathematics, spelling, and color characteristics. Unfortunately, many children lack access to educational tools that can enable their educational development in these and other areas.

Known educational tools are not entirely satisfactory for the range of applications in which they are employed. For example, existing educational tools fail to provide a fun, interactive experience to children. Parents and educators alike recognize that interactive and fun activities are effective ways to maintain children's focus and interest. Maintaining a child's focus and interest is essential to conveying core educational concepts.

Many existing educational tools do not give children and parents sufficient opportunity to interact with the tool, which causes children to lose interest in the tool and the educational concepts involved. Physically manipulating and exploring items is inherent to children, and tools are needed that facilitate those natural physical instincts of children to hold their attention.

Existing educational tools also suffer from being too complicated in some contexts. For example, computerized educational tools are prone to being too complicated or too abstract to meet children's needs. Computerized tools may allow interaction with a mouse or touch screen, but such interaction is not as inherent to children as is manipulating and exploring physical items with an optimum number of interactive degrees of freedom.

A particular limitation of conventional educational tools is their failure to bridge gaps between abstract concepts and concrete realities more readily understood by children. For example, educational tools directed to mathematics are often limited to symbolic representations of numbers without providing depictions of real-word, relatable items to give context to the mathematical concepts involved. Educational tools attempting to teach children letters and spelling often lack reinforcing, engaging, approachable subject matter that helps children see how letters interact to form words.

Thus, there exists a need for educational tools that improve upon and advance the design of known educational tools. Examples of new and useful educational tools relevant to the needs existing in the field are discussed below.

Disclosure addressing one or more of the identified existing needs is provided in the detailed description below. Examples of references relevant to educational tools include U.S. Pat. Nos. 8,459,999; 2,932,909; D394,878; D395,675; D651,649; 3,419,973; 3,783,531; 3,762,071; 3,200,517; 3,199,227; 4,634,385; 4,389,193; 3,289,324; 1,671,758; 4,643,680; 7,354,070; 4,313,727; 3,248,809; 6,869,286; and 2,938,282. The complete disclosures of the above patents and patent applications are herein incorporated by reference for all purposes.

SUMMARY

The present disclosure is directed to educational tools including a cover, a shaft, and a rotating member. The cover includes an interactive section having a fixed set of indicia, a first lateral section pivotally coupled to the interactive section, and a second lateral section pivotally coupled to the interactive section opposite the first lateral section. The shaft is mounted to the interactive section and the rotating member is rotationally mounted to the shaft. The rotating member has a rotating set of indicia at a plurality of radial positions. The rotating member is configured to selectively rotate about the shaft to a plurality of aligned positions where the rotating set of indicia and the fixed set of indicia align. The rotating set of indicia and the fixed set of indicia are selected to have educational significance when aligned in selected combinations. In some examples, the educational tool includes a second rotating member.

DETAILED DESCRIPTION

The disclosed educational tools will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various educational tools are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The educational tools described herein function to provide children, parents, and educators with fun, interactive ways to explore core educational concepts. The shortcomings of conventional educational tools are effectively addressed by the present educational tools described in detail below, including by educational tools 100 and 200 shown in the figures.

For example, educational tool 100 provides users with a variety of physical and social interaction options without providing so many options that the tool becomes offputtingly complex. Unlike computer and computer tablet based tools, educational tool 100 provides users with opportunities to interact with physical items rather than peripheral devices or touchscreens, which are steps removed from directly interacting with educational components.

Educational tool 100 further provides users with a variety of games, challenges, and activities to play. Educational tool 100 provides additional entertainment and appeal by converting from a configuration resembling a closed book to an open configuration with aspects reminiscent of a board game and other aspects reminiscent of a comic book.

Addressing limitations existing in the prior art, educational tool 100 provides a rotating member that children can manipulate and align to form words to help encourage children to explore letters and learn how to spell basic words. The physical interaction with selectable letter combinations and related graphical depictions of letters and word help reinforce connections between letters, letter combinations, and recognized words.

Addressing additional limitations of conventional educational tools, educational tool 200 helps children bridge conceptual gaps between abstract representations of numbers as symbols by providing depictions of objects representing numbers. Further pictorial depictions of mathematical operations, such as adding items together or subtracting items, help reinforce mathematical games that can be played with educational tool 200.

First Embodiment of the Educational Tool.

Figure 1:
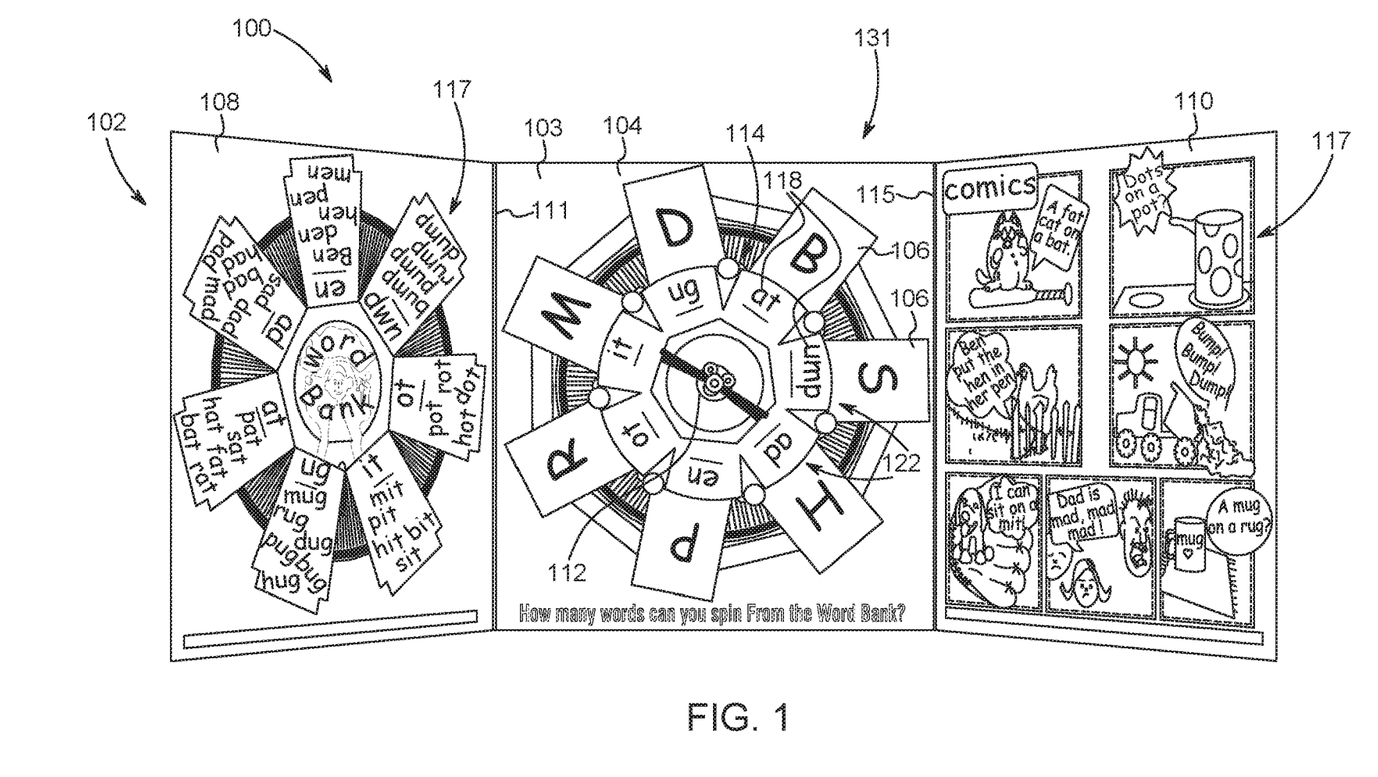
FIG. 1 is a perspective view of a first example of an educational tool focused on letters and words in a partially open configuration.
Figure 2:
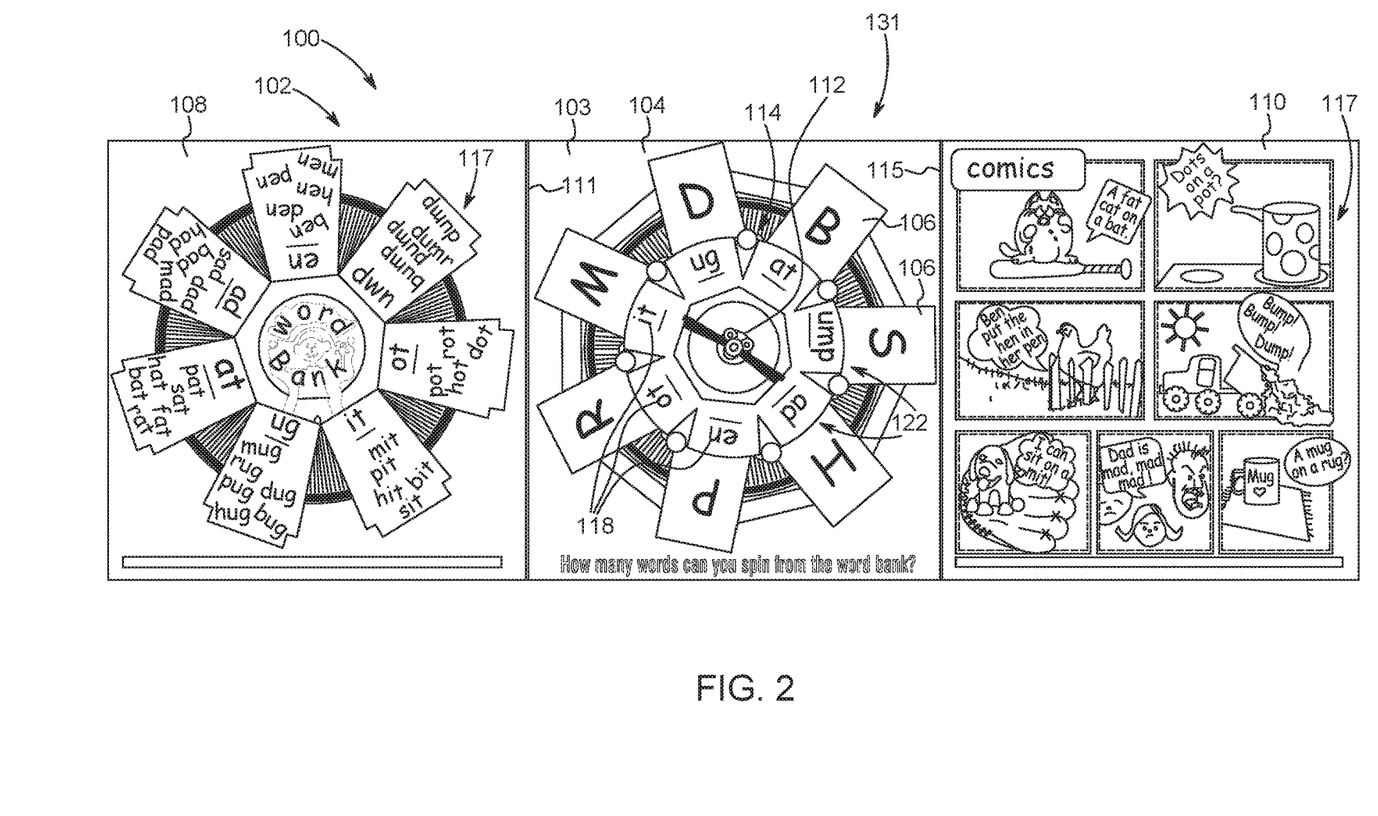
FIG. 2 is a plan view of the educational tool shown in FIG. 1 depicting certain letters on a rotating member aligned with letters on an interaction section in selected combinations where the letters form correctly spelled words.
Figure 3:
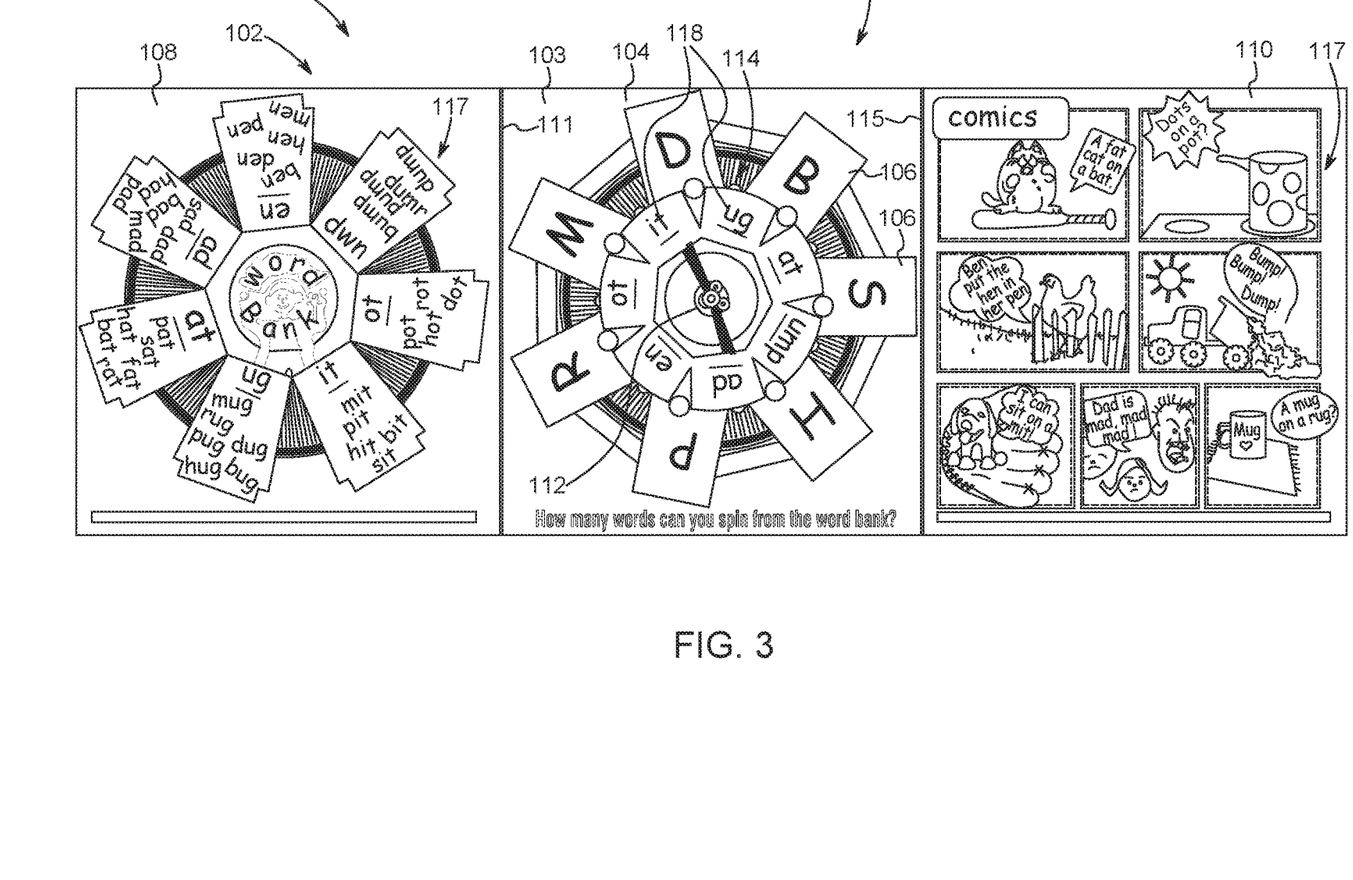
FIG. 3 is a plan view of the educational tool shown in FIG. 1 depicting certain letter combinations not aligned in the selected combinations such that the letters do not form correctly spelled words.

With reference to FIGS. 1-4, a first example of an educational tool, educational tool 100, will be described in more detail. As can be seen in FIGS. 1-3, educational tool 100 includes a cover 102, a shaft 112, and a rotating member 114. Educational tool 100 meets the current English language standards for children ages 3 to 6 as established by the Common Core State Standards. The components of educational tool 100 will now be described in more detail.

Cover.

Cover 102 functions to selectively configure educational tool 100 into different configurations and to support the other components of educational tool 100. In the example shown in FIGS. 1-4, cover 102 includes an interactive section 103, a first lateral section 108 pivotally coupled to interactive section 103, and a second lateral section 110 pivotally coupled to interactive section 103 opposite first lateral section 108. In other examples, the cover has more than three sections, such as four sections, five sections, and six or more sections. In some examples, the cover has two sections or a single section.

Fold lines, hinges, or bindings may define the boundaries of the sections. In the present example, cover 102 is configured to fold about a first fold line 111 and a second fold line 115. Cover 102 is formed from card stock paper, but any currently known or later developed substrate suitable for selectively adopting different configurations and for supporting components of the educational tool may be used. In a particular example, the cover is formed from heavy card stock with sufficient rigidity to enable the cover to stand upright. The cover may also be formed from plastic, metal, and composite materials to suit different applications and purposes.

Interactive section 103, first lateral section 108, and second lateral section 110 each have substantially planar faces. In other embodiments, one or more of the sections have faces with non-planar topographies, such as to depict landscapes, human characters, animals, fanciful creatures, or buildings, etc. In the present example, interactive section 103 has a substantially planar face 104.

In the example shown in FIGS. 1-4, fixed set of indicia 106 printed on interactive section 103 includes letters. The letters are disposed on face 104 of interactive section 103 at a plurality of positions proximate and around rotating member 114.

Figure 5:
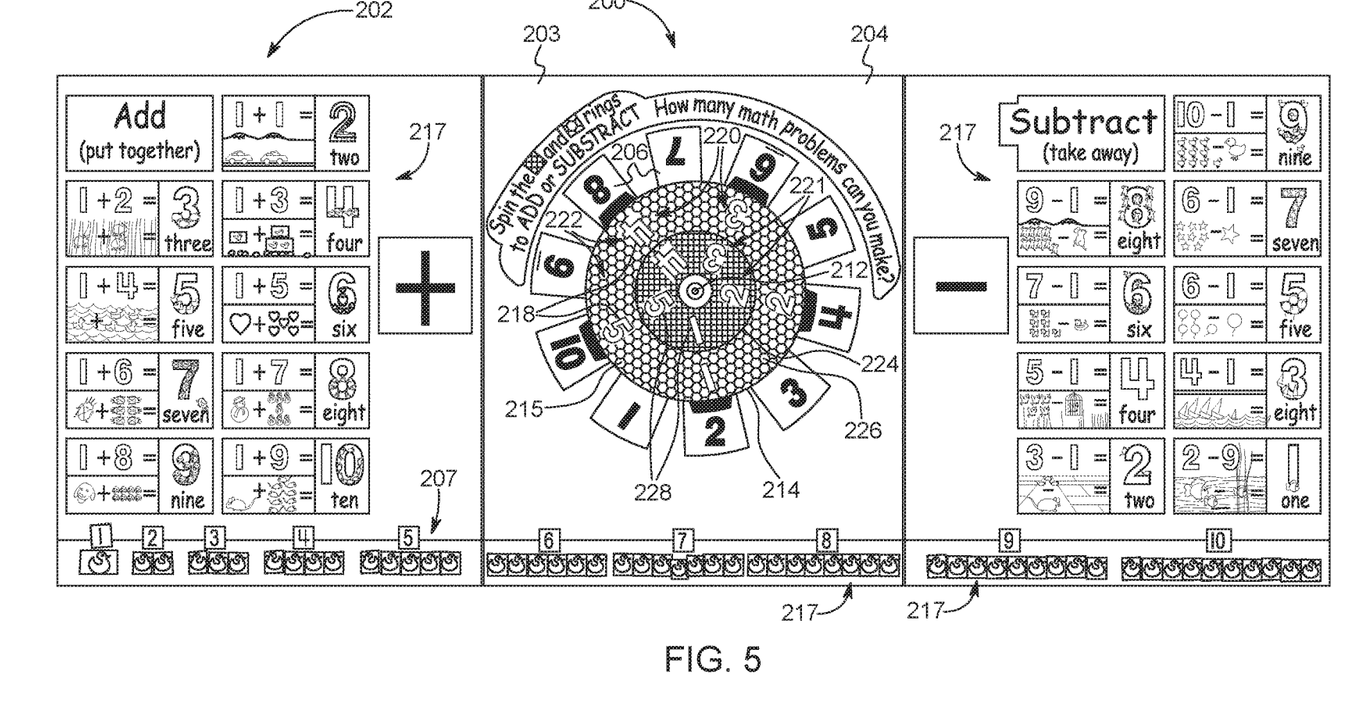
FIG. 5 is a plan view of a second example of an educational tool focused on numbers with a first rotating member and a second rotating member aligned in a selected combination where the numbers form mathematically accurate equations.
Figure 6:
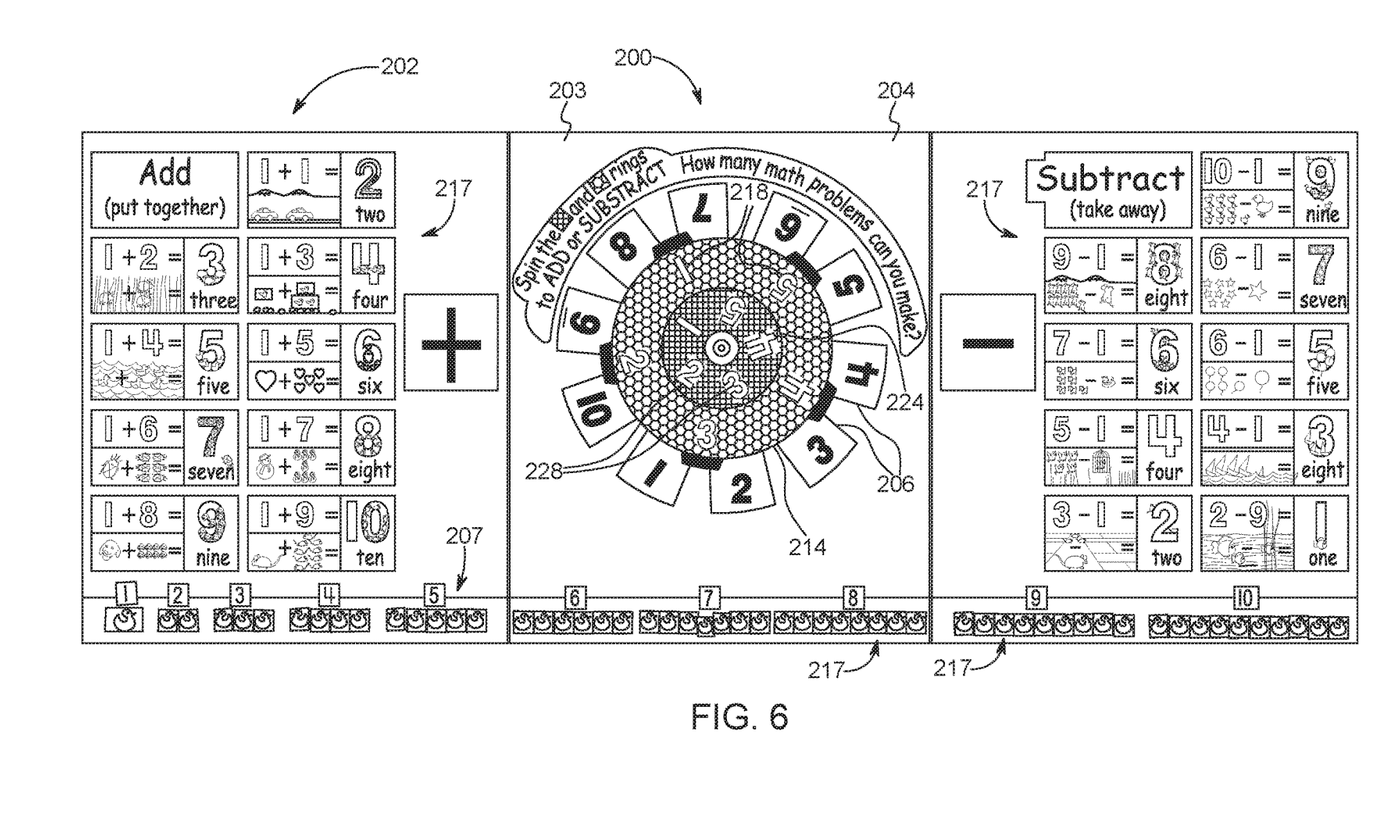
FIG. 6 is a plan view of the educational tool shown in FIG. 1 depicting the first rotating member and the second rotating member not aligned in a selected combination such that the numbers do not form mathematically accurate equations.

In other examples, such as educational tool 200 shown in FIGS. 5 and 6, the fixed set of indicia may include numbers. In further examples, the interactive section may include features in addition or alternatively to indicia, such as colors, textures, smells, notes, sounds, or any other features having educational significance.

As the reader can see in FIGS. 1-3, first lateral section 108 and second lateral section 110 include printed subject matter 117. Printed subject matter 117 is selected to reinforce the educational significance of indicia provided on rotating member 114 and on face 104 of interactive section 103. In particular, printed subject matter 117 of first and second lateral sections 114 and 116 is selected to reinforce the educational significance of a rotating set of indicia 118 and fixed set of indicia 106 (provided on rotating member 114 and on face 104, respectively). As explained more below, rotating set of indicia 118 and fixed set of indicia 106 are selected to be selectively aligned in selected combinations by rotating member 114 relative to fixed set of indicia 106 provided on face 104.

In the present example, the backside of second lateral section 110 includes letters (not pictured) arranged such that a child may trace the letters with a finger or marking device. Likewise, the backside of the second lateral section of cover 202 in educational tool 200 includes numbers arranged such that a child may trace the numbers with a finger or marking device. Arrows are provided to instruct the child on the proper direction to trace the letters and numbers. Suitable marking devices include pencils, pens and markers. Particularly well suited are pens or markers with ink configured to be erased or to disappear over time. In this manner, children are given an effective way to begin developing motor skills and muscle memory for writing letters and numbers by hand.

In the example shown in FIGS. 1-4, first lateral section 108, interactive section 103, and second lateral section 110 have substantially the same dimensions. However, in other examples one or more sections include dimensions that differ from the other sections.

Figure 4:
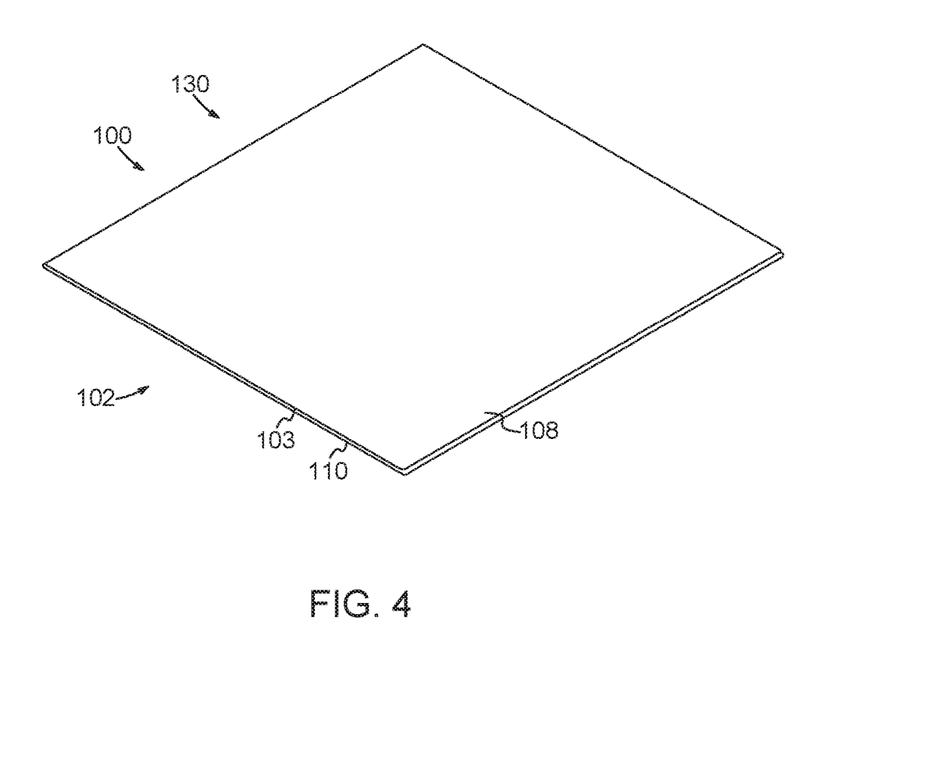
FIG. 4 is a perspective view of the educational tool shown in FIG. 1 in a folded configuration.

With reference to FIG. 4, a folded configuration 130 of educational tool 100) will now be discussed. Folded configuration 130 differs from an open configuration 131 shown in FIGS. 1-3 in that the sections of cover 102 overlie each other and educational tool 100 resembles a closed book. In contrast, in open configuration 131 depicted in FIGS. 1-3, the sections of cover 102 do not overlie each other and educational tool 100 resembles an open book.

As can be seen in FIG. 4 and the other figures, first lateral section 108 is configured to pivot to a position overlying interactive section 103. The reader can further see in FIG. 4 that second lateral section 110 is configured to pivot to a position overlying interactive section 103 and overlying first lateral section 108 when positioned to overlie first lateral section 108. When the sections are pivoted to overly each other as shown in FIG. 4, they collectively define folded configuration 130.

Shaft.

Shaft 112 serves to rotationally support rotating member 114. Shaft 112 is mounted to interactive section 103 perpendicular to face 104 of interactive section 103. Any currently known or later developed form of shaft, pivot, or bearing may be used to rotationally support rotating member 114. The shaft or other rotational support member may be configured to provide continuous rotation or rotation to discrete radial positions.

Rotating Member.

Rotating member 114 provides an interactive component to educational tool 100. Rotating member 114 is rotationally mounted to shaft 112 and functions to rotate about shaft 112 to a plurality of continuous positions. The rotating capability of rotation member 114 enables children, parents, and educators to selectively align letters provided on rotating member 114 with letters provided on face 104 of interactive section 103. In the present example, rotating member 114 cooperates with shaft 112 to rotate substantially continuously about shaft 112; however, in other examples the rotating member cooperates with the shaft or other rotational support member to rotate to discrete radial positions.

As can be seen in FIGS. 1-3, rotating member 114 has a major face 116 and a rotating set of indicia 118 at a plurality of radial positions 120 on major face 116 of rotating member 114. In the present example, rotating set of indicia 118 includes letters. In other examples, such as educational tool 200 shown in FIGS. 5 and 6, the rotating set of indicia may include numbers. In other examples, the rotating member may include features in addition or alternatively to indicia, such as colors, textures, smells, notes, sounds, or any other features having educational significance.

To provide educational and entertainment value, rotating member 114 is configured to selectively rotate about shaft 112 to a plurality of aligned positions 122 where rotating set of indicia 118 and fixed set of indicia 106 align. The reader can see in FIGS. 1-3 that rotating set of indicia 118 and fixed set of indicia 106 are selected to have educational significance when aligned in selected combinations. In the present example depicted in FIGS. 1-4, rotating set of indicia 118 and fixed set of indicia 106 form words when aligned in the selected combinations.

As can be seen in FIGS. 1-3, words formed in the selected combinations include bat, bug, bit, Ben, bad, bump, sump, sat, sit, sad, had, hump, hat, hug, hit, hot, hen, and others. The reader can also see that some combinations of letters from rotating set of indicia 118 and fixed set of indicia 106 do not form correctly spelled or recognized words, such as sug, sot, sen, rit, etc. For purposes of this disclosure, combinations of letters from the rotating set of indicia and the fixed set of indicia are said to form words when they combine to form recognized, correctly spelled words as opposed to combining to form letter combinations that do not correspond to recognized or correctly spelled words.

Rotating member 114 and rotating set of indicia are directed to short vowel sounds. Educational tool 100 is configured to enable rotating member 114 to be selectively removed and replaced with a different rotating member with different indicia thereon as desired. Thus, rotating members with indicia directed to vowel combinations other than short vowel sounds may be selectively mounted to the shaft as desired to expand the educational and entertainment value of the educational tool.

In examples where the educational tool is directed to educational concepts other than letters and words, the features provided by the interactive section and the rotating member will have alternative forms of educational significance when aligned in selected combinations. For example, when the features include colors, the colors may overlap when aligned in selected combinations to form new, blended colors. When the features include textures, the rotating member may include depictions of things corresponding to the texture provided on the face of the interactive section or vice versa in selected combinations. As shown in FIGS. 5 and 6 where the features are numbers, the selected combinations correspond to mathematically accurate equations.

Second Embodiment of the Educational Tool.

With attention to FIGS. 5 and 6, a second example of an educational tool, educational tool 200, will now be described. Educational tool 200 includes many similar or identical features to educational tool 100. Thus, for the sake of brevity, each feature of educational tool 200 will not be redundantly explained. Rather, key distinctions between educational tool 200 and educational tool 100 will be described in detail and the reader should reference the discussion above for features substantially similar between the two educational tools.

As can be seen in FIGS. 5 and 6, educational tool 200 includes a folding cover 202, a shaft 212, a first rotating member 214, and a second rotating member 224. Whereas educational tool 100 was focused on letters and words, educational tool 200 is focused on numbers and basic mathematical equations. Educational tool 200 meets the current mathematics standards for children ages 3 to 7 as established by the Common Core State Standards. Educational tool 200 includes printed subject matter 217 reinforcing the addition and subtraction mathematical operations introduced by educational tool 200.

The reader can see in FIGS. 5 and 6 that educational tool 200 includes two rotating members as opposed to a single rotating member as included in educational tool 100. First rotating member 214 is rotationally mounted to shaft 212 at a first position on shaft 212 and second rotating member 224 mounted to shaft 212 at a second position on shaft 212 farther from interactive section 203 than the first position on shaft 212.

As shown in FIGS. 5 and 6, first rotating member 214 and second rotating member 224 are circular, however, they may be any suitable shape in other examples, such as square, triangular, oval, etc. In the present example, first rotating member 214 has a first radial dimension and second rotating member 224 has a second radial dimension that is smaller than the first radial dimension.

First rotating member 214 has a first major face 215 and a first set of numbers 218 at a plurality of radial positions 220 on first major face 215 of first rotating member 214. Second rotating member 224 has a second major face 226 and a second set of numbers 228 at a plurality of radial positions 221 on second major face 226 of second rotating member 224.

As shown in FIGS. 5 and 6, interactive section 203 includes a fixed set of numbers 206 on the face of interactive section 203 disposed proximate and around first rotating member 214. Similar to how rotating set of indicia 118 and fixed set of indicia 106 cooperate to align in selected combinations with educational significance in educational tool 100, first rotating member 214 and second rotating member 224 are configured to selectively and cooperatively rotate about shaft 212 to a plurality of aligned positions 222 where first set of numbers 218, second set of numbers 228, and fixed set of numbers 206 align.

In educational tool 200, the educational significance of the numbers aligned in selected combinations is that first set of numbers 218, second set of numbers 228, and fixed set of numbers 206 are selected to form mathematically accurate equations when aligned in selected combinations. In contrast, first set of numbers 218, second set of numbers 228, and fixed set of numbers 206 collectively form mathematically inaccurate equations when aligned in combinations other than the selected combinations. The mathematical equations collectively formed by first set of numbers 218, second set of numbers 228, and fixed set of numbers 206 include adding or subtracting the numbers from first rotating member 214 with the numbers from second rotating member 224 to yield the numbers of fixed set of numbers 206 disposed on face 204 of interactive section 203.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An interactive and educational tool, comprising:
a cover including;
an interactive section having a substantially planar face and a fixed set of indicia disposed on the face;
a first lateral section pivotally coupled to the interactive section;
a second lateral section pivotally coupled to the interactive section opposite the first lateral section;
a shaft mounted to the interactive section perpendicular to the face of the interactive section;
a rotating member rotationally mounted to the shaft, the rotating member having a major face and a rotating set of indicia at a plurality of radial positions on the major face of the rotating member;
wherein:
the rotating member is configured to selectively rotate about the shaft to a plurality of aligned positions where the rotating set of indicia and the fixed set of indicia align; and
the rotating set of indicia and the fixed set of indicia are selected when aligned in selected combinations.

2. The interactive and educational tool of claim 1, wherein the rotating set of indicia includes letters.

3. The interactive and educational tool of claim 2, wherein the fixed set of indicia includes letters.

4. The interactive and educational tool of claim 3, wherein the rotating set of indicia and the fixed set of indicia form words when aligned in the selected combinations.

5. The interactive and educational tool of claim 4, wherein the rotating set of indicia and the fixed set of indicia do not form words when aligned in combinations other than the selected combinations.

6. The interactive and educational tool of claim 1, wherein:
the rotating member defines a first rotating member;
the rotating member is mounted to the shaft at a first position on the shaft;
the major face defines a first major face;
the rotating set of indicia defines a first rotating set of indicia; and
the educational tool further comprises a second rotating member mounted to the shaft at a second position on the shaft farther from the interactive section than the first position on the shaft, the second rotating member having a second major face and a second rotating set of indicia at a plurality of radial positions on the second major face of the second rotating member.

7. The interactive and educational tool of claim 6, wherein:
the first rotating member has a first radial dimension; and
the second rotating member has a second radial dimension that is smaller than the first radial dimension.

8. The interactive and educational tool of claim 7, wherein the first rotating set of indicia includes numbers.

9. The interactive and educational tool of claim 8, wherein the second rotating set of indicia includes numbers.

10. The interactive and educational tool of claim 9, wherein:
the fixed set of indicia includes numbers disposed on the face of the interactive section at a plurality of positions proximate and around the first rotating member;
the first rotating set of indicia, the second rotating set of indicia, and the fixed set of indicia collectively form mathematically accurate equations when aligned in the selected combinations.

11. The interactive and educational tool of claim 10, wherein the first rotating set of indicia, the second rotating set of indicia, and the fixed set of indicia collectively form mathematically inaccurate equations when aligned in combinations other than the selected combinations.

12. The interactive and educational tool of claim 10, wherein the mathematical equations collectively formed by the first rotating set of indicia, the second rotating set of indicia, and the fixed set of indicia include adding or subtracting the numbers from the first rotating member with the numbers from the second rotating member to yield the numbers of the fixed set of indicia disposed on the face of the interactive section.

13. The interactive and educational tool of claim 6, wherein the first rotating member and the second rotating member are circular.

14. The interactive and educational tool of claim 1, wherein:
the first lateral section, the interactive section, and the second lateral section have substantially the same dimensions;
the first lateral section is configured to pivot to a position overlying the interactive section;

the second lateral section is configured to pivot to a position overlying the interactive section and overlying the first lateral section when positioned to overlie the first section to define a folded configuration.

15. The interactive and educational tool of claim 1, wherein the first lateral section and the second lateral section include printed subject matter selected for the rotating set of indicia and the fixed set of indicia when aligned in the selected combinations.

\* \* \* \* \*